May 26, 1942.  P. P. KRIEK  2,284,397
APPARATUS FOR USE IN THE MANUFACTURE OF RAYON
Filed Jan. 16, 1940
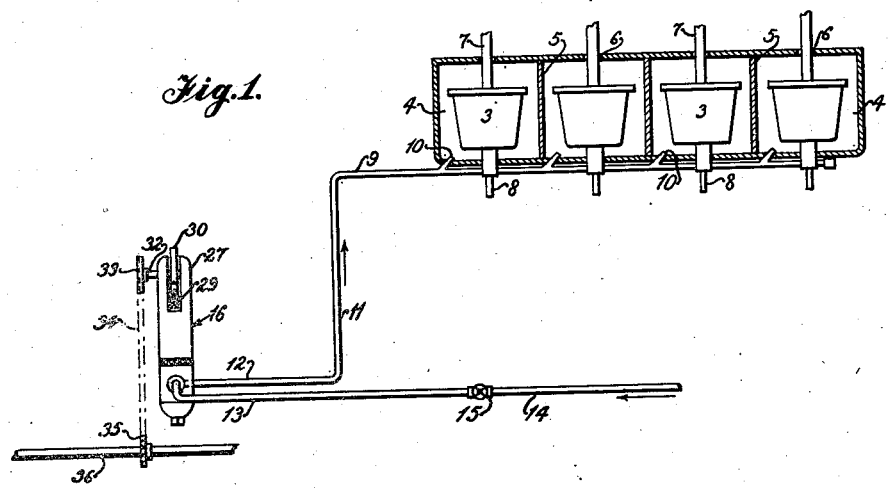
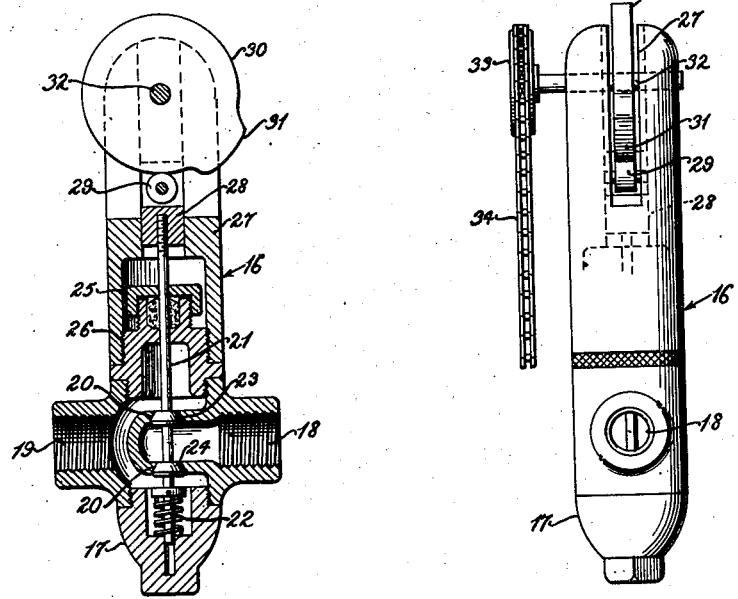
Inventor
Peter P. Kriek
By Albin F. Knight
Attorney

UNITED STATES PATENT OFFICE 2,284,397

APPARATUS FOR USE IN THE MANUFACTURE OF RAYON

Peter P. Kriek, Enka, N. C., assignor to American Enka Corporation, Enka, N. C., a corporation of Delaware Application January 16, 1940, Serial No. 314,163

2 Claims. (Cl. 18—8)

This invention relates to the manufacture of rayon by the centrifugal pot spinning process, and more particularly to an apparatus for preventing or inhibiting the accumulation of salt deposits upon the walls of the spinning pot chamber and upon the spinning pot itself. Additionally, the invention contemplates a mechanism for automatically removing at regular intervals, any accumulation of salt which becomes deposited on the walls of the pot or pot chamber between the periods of removal.

In the manufacture of rayon by the pot spinning process, for example, viscose rayon, wherein chemicals are employed to coagulate the spinning solution, certain salts tend to crystallize upon the outside of the rotating pot and upon the walls of the chamber in which the pot is enclosed. Such salt deposits constitute a serious threat to the efficient operation of the machine, since the added weight of the salt constitutes an additional burden imposed upon the spinning pot supporting and driving mechanism. Furthermore, it has been found that in the manufacture of viscose rayon, by accretion the salt deposits may eventually close the gap between the spinning pot chamber and the pot itself and therefore interfere with the revolution of the pot. In fact, frequent stoppage of the spinning machines has been necessary in the past to remove the salt deposits, with the consequent loss of time and expenditure of labor.

The present invention is designed to overcome the difficulties heretofore encountered, and in general, it contemplates means for maintaining a high degree of humidity in the chamber surrounding the spinning pot, which means include spray nozzles designed to project streams of salt dissolving liquid, for example water, against the wall of the rapidly rotating pot to thus fill the pot chamber with moisture in order to inhibit the crystallization of salts upon the walls thereof, as well as to remove such deposits as have already formed.

In the preferred form of my invention, the spraying of the pots is effected at regular intervals rather than continuously, and in this connection it is well to note that continuous spraying of the pots throughout a spinning period is not necessary to maintain a degree of humidity sufficient for the avoidance or removal of salt deposits. In fact, the continuous spraying of a salt dissolving liquid entails the wasting of large quantities thereof.

It has previously been proposed to spray centrifugal pots during a spinning operation to remove salt deposits, and it is not my intention to broadly claim this feature. However, the processes previously in use have involved the manual control of the spraying mechanism, and for this reason they have been expensive from the point of view of operating supervision and water usage. These disadvantages are especially apparent when it is considered that in a rayon manufacturing plant a large number of pot spinning machines are operated simultaneously. Thus, if it were desired to eliminate the element of supervision and spray the pots on each of a plurality of machines continuously throughout a spinning period, an enormous amount of water would be required, a large percentage of which would be wasted. On the other hand, if it were desired to spray the pots only at intervals, in order to economize on water, constant supervision of the fluid supply control would be required to see that the proper amount of water or other liquid is supplied to each spinning machine at the proper time. If the intervals are too long the humidity in the pot chamber declines to such an extent that the exposed surfaces of the equipment become dry and salts crystallizing thereon gain a firm foothold which requires a great deal of water to effect their removal.

Theoretically, it is possible for one or more operators to manually control the water supply to the spray nozzles in such a manner that no water will be wasted and that thus the proper degree of humidity will be maintained in the pot chambers. However, in practice the human element is found to be variable, and manual control, therefore, unsatisfactory from the point of view of efficiency and economy. This will be readily understood when it is considered that should the operator allow the spray nozzles on a spinning machine to flow longer than is necessary for removal of salt deposits, water will be wasted while if larger salt deposits than usual are allowed to accumulate before the nozzles are turned on, an excessive amount of water will be required to remove the deposits.

The present invention solves the problems heretofore encountered, efficiently and economically, for among other reasons it eliminates the human element in pot spray control and reduces the water consumption of the spinning machines to the minimum required to keep the centrifugal pots free of salt deposits. Therefore, one of the objects of this invention is the provision of means for maintaining a high degree of humidity in the spinning pot chamber with a minimum amount of water, in order to inhibit the formation of salt deposits.

Another object of the invention is the provision of means for automatically controlling the delivery of water to the spray nozzles of pot spinning machines.

Other objects and advantages will appear from the following detailed description when considered in connection with the accompanying drawing, wherein Fig. 1 is a diagrammatic representation of a pot spinning machine showing the essential elements of the invention;

Fig. 2 is a detailed view in partial section of a valve and cam arrangement which controls the spraying of the pots; and Fig. 3 is a side elevation of the control means illustrated in Fig. 2, together with the driving mechanism therefor.

Referring particularly to Fig. 1, the numerals 3 designate a series of spinning pots, each of which is enclosed within a chamber 4. The chambers are separated from each other by partions 5 and they are provided in their upper walls with central apertures 6, each of which has freely received therein for vertical movement, a funnel guide 7. Through the intermediary of the funnel guides 7, freshly spun thread is led into the rotating centrifugal pots 3, rotated by spindles 8 from a source of power (not shown).

Salt crystals derived from chemicals used in the spinning process tend to collect upon the outside walls of the pots 3 and the walls of the pot chambers 4, thereby endangering the successful operation of the machines. In order to prevent or inhibit the formation of these salt deposits, or to remove them after they have formed, there is provided a fluid supply pipe 9 having a nozzle 10 projecting therefrom into the interior of each pot chamber 4, which nozzles are adapted to project a liquid against the outer walls of the respective pots 3. Pipe 9 constitutes one arm of a series of connected pipes 11, 12, 13 and 14, through which the liquid flows on its way to the spray nozzles. The inlet pipe 14 is provided with a stop cock 15.

Seated in pipe 13 is a valve 16 (see Fig. 2) which includes a base 17, inlet and outlet ducts 18 and 19 respectively, valve seats 20, a valve stem 21, a spring 22 and valve discs 23 and 24 for engaging seats 20 when the valve stem 21 and the discs 23 and 24 which are carried thereby are biased to the closed position. Valve 16 is centrally apertured at its upper portion and is capped by a pack nut 25, through which valve stem 21 extends for free vertical movement. The upper portion of the valve is threaded at 26 for the reception thereover of an internally threaded hollow cylindrical member 27.

The hollow interior of cylindrical member 27 is reduced at its upper portion to receive a cam follower 28, which is firmly affixed to valve stem 21 and bifurcated at its upper portion to provide a space for a roller 29, which is mounted for free rotation on a shaft secured on the upstanding arms of the follower. The upper portion of cylindrical member 27 is slotted to receive a cam 30 provided with cam projection 31. Cam 30 is affixed to axle 32, which is mounted for free rotation in the walls of cylindrical member 27.

Cam 30 is driven by means of a sprocket wheel 33 fixed upon a projecting end of axle 32, which sprocket wheel is in turn driven by chain 34. Chain 34 derives its power from a sprocket wheel 35, which is keyed to spinning pump drive shaft 36. However, it is to be understood that the cam 30 might be driven from any other suitable source of power or the sprocket wheel 35 could be fixed to an independently driven shaft.

In operating the mechanism described, the spinning machine is set in operation in the usual manner and the yarns are directed through the respective funnels 7 and collected in the pots. Water is forced through pipe 14 and intermittently through valve 16 to the spray nozzles 10 projecting into pot chambers 4. The water is projected in a small stream from each of the nozzles 10 intermittently against the walls of the rapidly revolving pots 3 and it is disseminated throughout the pot chamber by the centrifugal force of the pot. Intermittent operation of the valve 16 is effected by means of the cam 30, driven from the spinning pump shaft 36 which also controls the quantity of material extruded for the formation of the yarns. Cam 30 bears against the roller 29 mounted in the cam follower 28, periodically lowering the valve stem 21, and permitting the same with valve discs 23 and 24 to rise in response to the action of spring 22.

The frequency with which the valve is opened and the duration of water discharge from the jets is dependent, of course, upon the shape of the cam and upon the speed of rotation thereof, which in turn, is dependent upon the relative sizes of the sprocket wheels 33 and 35 and upon the speed of the spinning pump drive shaft 36. For example, with a spinning pump drive shaft speed of 24 R. P. M. and a ratio between sprocket wheels 35 and 33 of 2 to 1, cam 30 will revolve at the rate of 12 R. P. M. and the valve will, therefore, open 12 times per minute for the discharge of water from the spray nozzles 10.

In the drawing the length of the arc defined by the cam projection 31 is shown as one-tenth of the circumference of the cam. With the cam completing a revolution every 5 seconds, the valve will be open one-tenth of the time, that is, one-half second out of every 5, or 6 seconds out of every minute.

Thus my invention provides for the automatic intermittent spraying of the spinning pots, with the entire elimination of the necessity for supervision. Hence the consumption of water is reduced to the minimum required for inhibiting the formation of dangerous salt deposits by the maintenance of a high degree of humidity in the spinning pot chamber at all times.

An alternate device that might be substituted for the intermittent valve mechanism, consists of a small plunger pump driven from any convenient source, this pump serving the combined purposes of timing the water spray and supplying the necessary pressure.

Having now described my invention, it is to be understood that it is capable of variation and modification, and it is my desire that I be limited only by the scope of the appended claims.

What is claimed is:

1. In a centrifugal pot collecting mechanism for freshly spun rayon, a spinning pump, means for actuating said pump, a centrifugal pot, a chamber therefor, means for directing a salt solvent into the chamber against the pot for removing any accumulation of salt which has formed thereon and for supplying sufficient moisture within the chamber to inhibit the formation of salt bodies for substantially uniform periods, valve means controlling the flow of salt solvent from said directing means, and cam means for actuating said valve means, said cam means being driven from the pump actuating means to thereby propel the cam at a speed directly proportional to the speed of operation of the pump actuating means for regularly effecting the delivery of solvent to the directing means to thereby supply the required moisture to cause the salt removal and inhibition of salt formation.

2. A centrifugal pot collecting mechanism for freshly spun rayon comprising a spinning pump, means for actuating the same, a centrifugal pot, a chamber therefor, means for directing a spray of salt solvent into said chamber, valve means controlling the flow of salt solvent from said directing means and means actuated in timed relation to the actuation of said pump to open and close the valve means at a frequency proportional to the rate of spinning and hence the rate of salt formation so as to supply without waste the required solvent to cause salt removal and inhibition of salt formation between periods of solvent supply.

PETER P. KRIEK.